United States Patent [19]

Perrin

[11] 4,189,172
[45] Feb. 19, 1980

[54] PIPE COUPLING

[76] Inventor: Duane O. Perrin, 2522 232nd St., Torrance, Calif. 90505

[21] Appl. No.: 936,888

[22] Filed: Aug. 25, 1978

Related U.S. Application Data

[63] Continuation-in-part of Ser. No. 844,631, Oct. 25, 1977, abandoned.

[51] Int. Cl.² .............................................. F16L 23/00
[52] U.S. Cl. .......................................... 285/12; 285/94;
285/96; 285/236; 285/367
[58] Field of Search .................... 285/94, 96, 236, 112,
285/12, 106, 365, 367, 366, DIG. 12, 235

[56] References Cited

U.S. PATENT DOCUMENTS

| | | | |
|---|---|---|---|
| 1,867,891 | 7/1932 | Reynolds | 285/112 X |
| 1,925,335 | 9/1933 | Murphy | 285/94 |
| 2,028,182 | 1/1936 | Barnickol, Jr. | 285/112 |
| 3,228,714 | 1/1966 | Dricken | 285/236 |
| 3,558,164 | 1/1971 | Havell | 285/236 |
| 3,582,112 | 6/1971 | Pico | 285/96 |
| 3,682,503 | 8/1972 | Bloom | 285/369 X |
| 3,828,403 | 8/1974 | Perrin et al. | 285/365 X |
| 4,026,584 | 5/1977 | Lowe | 285/369 X |
| 4,081,599 | 3/1978 | Cookson | 285/96 X |

FOREIGN PATENT DOCUMENTS

| | | | |
|---|---|---|---|
| 355620 | 9/1905 | France | 285/367 |
| 1150947 | 8/1957 | France | 285/367 |
| 566017 | 8/1957 | Italy | 285/106 |

Primary Examiner—Thomas F. Callaghan
Attorney, Agent, or Firm—Freilich, Hornbaker, Wasserman, Rosen & Fernandez

[57] ABSTRACT

A pipe coupling which includes a continuous ring-shaped gasket that can be fitted around the abutting ends of two pipes and a clamp that can be fitted around the gasket and around flanges of the pipes. The clamp includes a grease fitting, while the gasket has a pair of upstanding flanges or ridges near its axially opposite ends, to form a grease reservoir that can hold grease under pressure. The grease applies pressure that helps seal the gasket against the pipe ends. The grease leaks out especially when the pipe carries pressure pulses, to lubricate the coupling so as to facilitate the turning of one pipe relative to the other with minimal wearing of the gasket. The gasket has a pair of inwardly-directed flanges that can rest upon the pipe flanges at the ends of the pipes and that are of greater height than the outer gasket flanges. The gasket can be easily turned inside-out, so that the thick flanges form a grease reservoir to enable more grease to be held in heavy duty and repeated rotation applications.

3 Claims, 5 Drawing Figures

PIPE COUPLING

CROSS-REFERENCE TO RELATED APPLICATION

This is a continuation-in-part of application Ser. No. 844,631 filed Oct. 25, 1977 and now abandoned.

BACKGROUND OF THE INVENTION

This invention relates to pipe clamps and couplings.

Certain pipe coupling applications require the use of devices for temporarily holding two pipes together. For example, in the pumping of concrete at a building site, it is necessary to rapidly connect pipes together that will carry the concrete under a high pressure such as 500 psi without substantial leaking. In some applications, the clamps merely hold long sections of pipes together, wherein the pipe sections remain stationary relative to one another after connection, or only tilt by several degrees. In other applications, such as in lifts that can extend a pipe line from the ground up to the height of a floor of a multi-story building at which concrete is being poured, the pipe ends surrounded by the coupling may have to undergo considerable rotation relative to one another. A pipe coupling which enabled the connection of pipe ends together that had to rotate relative to one another, and which minimized leakage and minimized wear on the coupling especially at the seal thereof, would be of considerable use. Such a coupling would be especially useful if part or all of it could also be utilized in couplings that only had to connect a pair of stationary pipes together.

SUMMARY OF THE INVENTION

In accordance with one embodiment of the present invention, a pipe coupling is provided which enhances the lifetime of use and the maintenance of the gasket thereof. The coupling includes a ring-shaped gasket of rubber-like material, and a clamp that can be clamped around the gasket and around a pair of pipe ends between which the gasket extends. The gasket can be formed with a pair of radially inwardly extending flanges for bearing against the adjacent ends of a pair of pipes that are connected, and a pair of outwardly extending flanges. A clamp that extends about the gasket can be formed with a grease fitting so that grease can be pumped into the region between the outer flanges, which region therefore forms a grease reservoir. During utilization of the coupling, when high pressures are applied to the pipes, the gasket sometimes flexes outwardly to pump out grease so it coats the coupling inner parts that move relative to the pipe line, to minimize friction and wear when one pipe rotates relative to the other. The pressured grease also can aid in holding the inner gasket flanges firmly against the pipe ends to minimize leakage of concrete sap.

The gasket can be formed with one pair of flanges thicker than the other pair. When the gasket is utilized to couple a pair of rotating pipes, it can be installed so that the thickest flanges are around the outside of the gasket, to provide a large grease-holding reservoir. When the gasket is utilized to connect a pair of pipes that will remain stationary with respect to one another, the gasket can be installed with its thickest flanges extending inwardly to ride against the pipe flanges, to facilitate installation of the gasket over the pipe ends. The smaller gasket flanges can then serve to minimize gouging of the gasket when the clamp is closed. The gasket is preferably constructed of relatively hard rubber, of an elasticity of more than 80 shore, and with flat outer flanges, to minimize outward deflection and pinching by a closing clamp.

The novel features of the invention are set forth with particularity in the appended claims. The invention will be best understood from the following description when read in conjunction with the accompanying drawings.

DESCRIPTION OF THE PREFERRED EMBODIMENT

Figure 1:
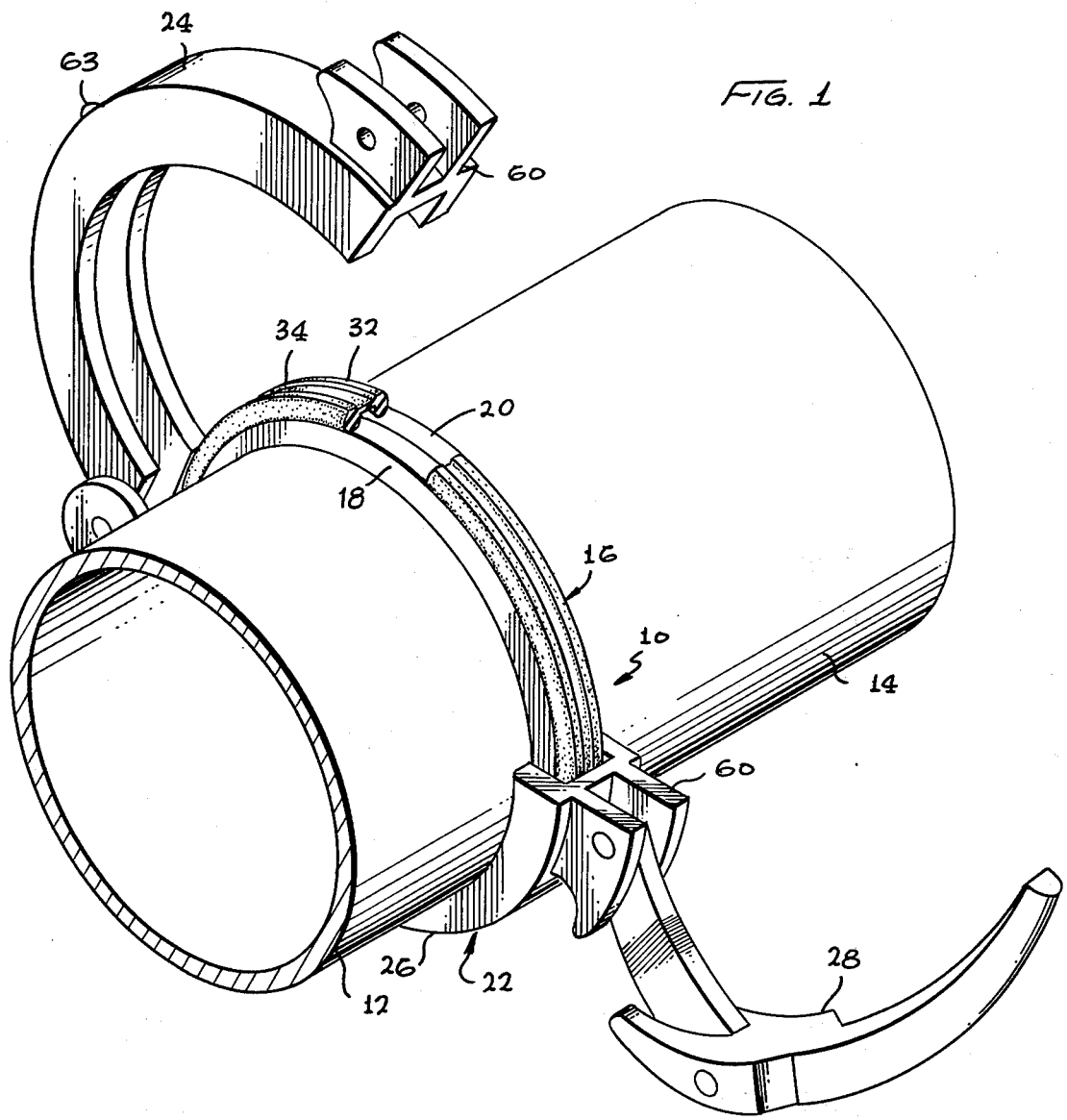
FIG. 1 is a perspective view of a coupling constructed in accordance with the present invention, as shown in the process of connecting a pair of pipes.

FIG. 1 illustrates a pipe coupling 10 which holds together and seals a pair of pipes 12, 14 having a pair of pipe flanges 18, 20. The coupling includes a gasket 16 which can be installed about the flanges 18, 20, and which is itself enveloped by a clamp 22. The clamp may be of the type described in U.S. Pat. No. 3,828,403 which includes two body members 24, 26 having pivotally joined hinge ends and with each body member extending in an arc of nearly 180° between their opposite ends. The clamp 22 includes a latch mechanism 28 which locks the two body members 24, 26 together around the gasket 16, in a seal over the flange ends of the pipes.

Figure 2:
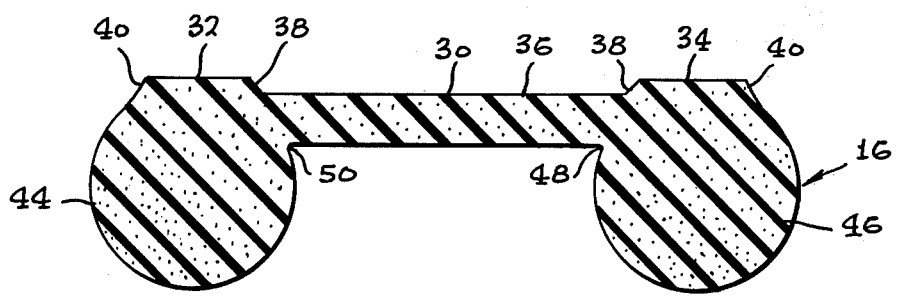
FIG. 2 is a sectional view of the gasket of the coupling of FIG. 1.

FIG. 2 illustrates the ring shaped gasket 16 which is of uniform cross-section and which is formed of an elastomeric material such as rubber. The gasket 16 includes a sleeve-like main body portion 30 having a pair of raised surfaces or flanges 32, 34 at the opposite axial ends of the main body portion. The flanges 32, 34 extend radially beyond the main body portion 30, and have flat outer surfaces parallel to the outer surface 36 of the main body portion. The edges 38, 40 of the flanges are beveled to extend at an incline angle of approximately 45° with respect to the surface 36 of the main body portion 30. The gasket also includes a pair of radially thicker flanges 44, 46 extending inwardly from the main body portion 30. Each of the flanges 44, 46 has a largely circular cross section, and has a slight undercut, 48, 50 at the sides that face one another. The radially inner portion of each flange 44, 46 is rounded in substantially a portion of a circle.

Figure 3:
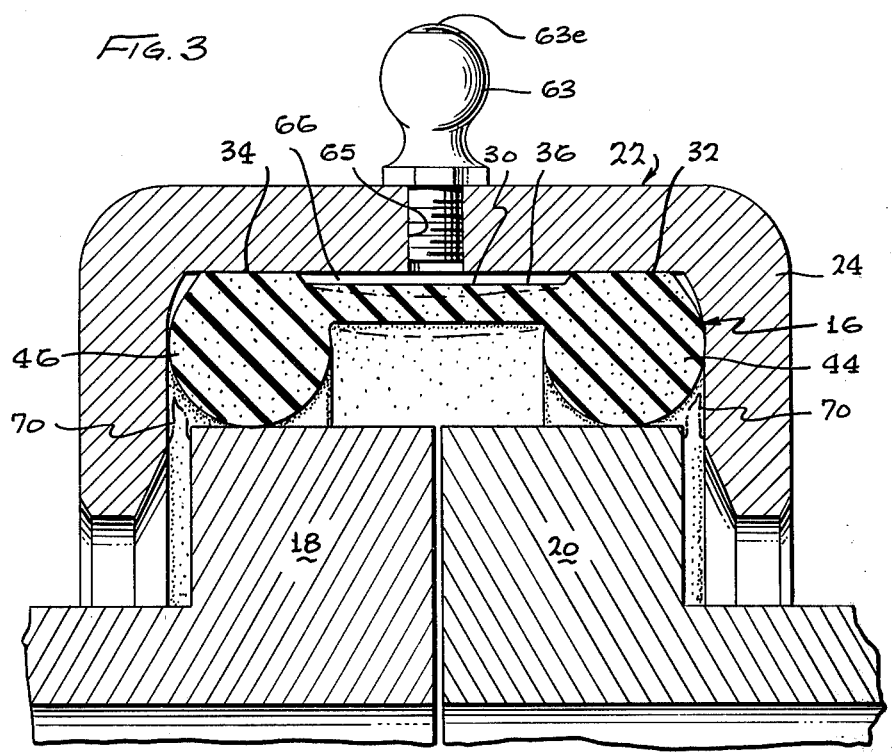
FIG. 3 is a sectional view similar to that of FIG. 2, but with the clamp in place.

FIG. 3 depicts a gasket 16 sandwiched between a clamp 22 and the flanges 18, 20 of a pair of pipes. The gasket acts as a seal insuring against leakage of pressured concrete in the pipes and particularly the sap thereof, by pressing tightly against the two pipe flanges. As mentioned above, the radially outer surface of the gasket 16 has a pair of upstanding flanges 32, 34. As the clamp closes over the gasket, the leading edges 60 (FIG. 1) of the clamp can bite into the gasket as it is compressed. It is found that by making the gasket 16 of a relatively hard rubber of at least 80 shore hardness, and utilizing the upstanding flanges 32, 34 which have surfaces substantially flat and parallel with the outer surface 36 of the main body, gouging of the gasket is minimized or eliminated. A typical rubber utilized in clamp gaskets, is of a hardness of about 60 shore. It is believed that pinching occurs because friction between the ends of the clamp and the gasket tends to cause the gasket portion caught between the ends 60 to buckle outwardly. The relatively hard rubber of at least 80 shore of the gasket 16 resists such outward buckling. Also the relatively wide flat surfaces of the upstanding flanges 32, 34 resist digging in of the clamp ends into the rubber. If the outer surfaces of the upstanding ridges 32, 34 were pointed or rounded to a small radius, then the clamp ends 60 would tend to dig in and cause buckling of the gasket. As the clamp closes, such buckling can cause deep gouging of the gasket, all of which is more greatly resisted by the relatively stiff gasket with flat upstanding ridges of the present invention.

Figure 4:
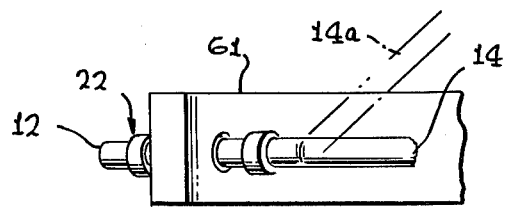
FIG. 4 is a partial perspective view of a pipe lift device which utilizes the clamp of FIG. 1.

The clamp 22 is designed to rotatably connect the pipes 12, 14. FIG. 4 shows the clamp 22 which connects a relatively stationary pipe 12 to another pipe 14 that is held on a pivoting arm 61 of a crane. The arm 61 may be raised to move the pipe to an upward incline as shown at 14a, so that concrete pumped along the pipe 12 can be pumped upwardly to reach an upper story of a building. Relative rotation of the ends of the pipes occurs within the clamp 22. Although continuous rotation does not occur, there is occasional rotation which, in the absence of special measures, can cause rapid wear and damage to the gasket.

Figure 5:
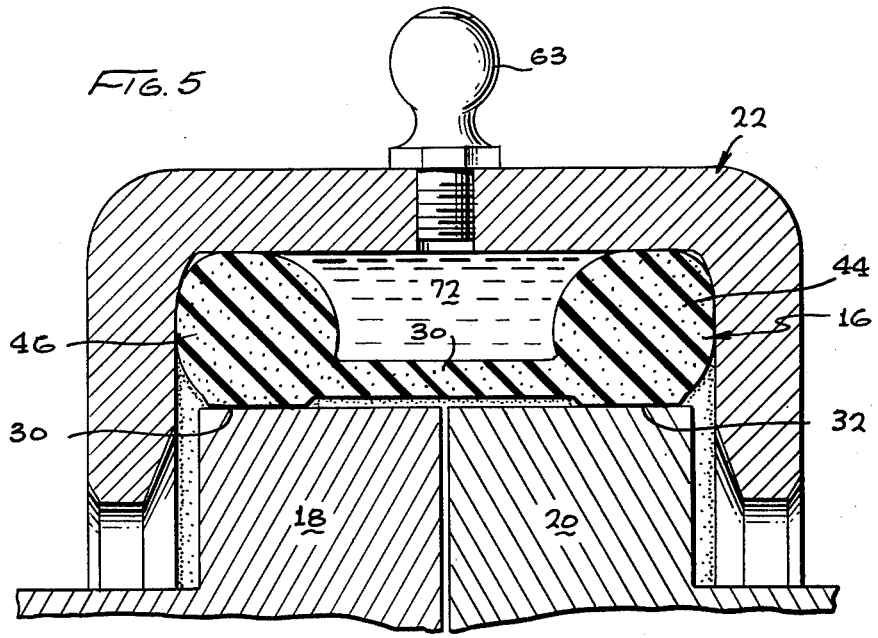
FIG. 5 is a view similar to that of FIG. 3, but showing the gasket installed in an inside-out orientation.

In order to minimize wear to the gasket 16 of the pipe coupling, the clamp 22 of the coupling is provided with a grease fitting 63, as shown in FIGS. 3 and 5. The grease fitting 63 has a filler end 63e lying outside the clamp body and a stem that extends into a threaded hole 65 formed in one member 24 of the clamp, to communicate with the region 66 lying between the main body 30 of the gasket and an inner wall of the clamp and between the gasket flanges 32, 34. When grease is applied under pressure through the fitting 63, the region 66 forms a grease reservoir. Initially, when grease is applied under high pressure through the fitting, the body 30 bows inwardly to enlarge the volume of the reservoir, and in addition, some of the grease may leak past the outer flanges 32, 34 to coat the outside of the gasket, including portions at 70 that lie against the pipe flanges 18, 20. Reciprocating pumps are typically used to pump concrete through the pipes, and the pressure pulses cause small amounts of the grease to be pumped out of the reservoir 66 and past the upstanding flanges 32, 34 to repeatedly supply the grease to the outside of the gasket.

The repeated supply of small amounts of grease on the outside of the gasket, lowers the friction between the gasket and the pipe flanges 18, 20 when they must turn relative to one another. For example, if the pipe flange 20 must rotate relative to the other pipe flange 18, about the axis of the pipes, then there will be rubbing of the gasket flange 44 on the pipe flange 20. The presence of grease at 70 helps to minimize the friction, and minimizes tearing of the gasket which would result from high friction. The sleeve-like gasket body 30 preferably has an axial length at least twice its radial thickness, so that it can be easily deflected inwardly during fillup of the grease reservoir, and then deflected outwardly by pressure pulses of pumped concrete to pump out small amounts of grease. The fact that the thin outer flanges 32, 34 lie directly radially outside the thicker inner flanges 44, 46 which lie on the pipe flanges, means that the outer flanges are well supported against the inside of the clamp to seal thereagainst and avoid premature rapid loss of grease from the grease reservoir.

As mentioned above, the gasket can be installed as shown in FIG. 3, to provide a grease reservoir 66 of small to moderate volume to supply small amounts of grease to the outside of the gasket during the course of a working day, to minimize friction against the gasket that could otherwise cause damage to it. It is found useful to refill the grease reservoir at the beginning of each day of use, to continue gasket protection. The size of the reservoir can be increased by installing the gasket in an inside-outside configuration as shown in FIG. 5. In FIG. 5, the gasket has been reversed so that the thickest flanges 44, 46 bear against the clamp 22 and form a larger grease reservoir 72 between the clamp, the flanges 44, 46 and the body 30 of the gasket. The orientation shown in FIG. 5 is useful under hard working conditions where a plentiful supply of grease is useful to avoid damage to a gasket which must repeatedly turn relative to one of the pipe flanges. However, the gasket is more difficult to apply over the pipe flanges 18, 20 in the inside-outside configuration of FIG. 5 and is then somewhat more liable to gouging from a closing clamp. The gasket 16 can be much more easily slipped over the ends of the pipes in the other configuration shown in FIG. 3, wherein the thickest flanges 44, 46 are radially innermost. The gasket 16 can be readily used to connect a pair of pipes which will remain substantially stationary with respect to one another during use, and in that case is more easily installed in the configuration shown in FIG. 3. In that case, a clamp without the fitting 63 and without a fitting-receiving hole 65 can be utilized. The gasket 16 can be easily turned inside out with all crevices exposed, for cleaning of a gasket to remove concrete therefrom.

Thus, the invention provides a pipe coupling which can include a gasket and a clamp surrounding the gasket to hold two pipe ends together, which minimizes damage to the gasket. The possibility of pinching of the gasket as two clamp halves close on one another, is minimized by utilizing a relatively hard rubber for the gasket of at least 80 shore, and by providing outstanding flanges with flat peripheries. In applications where there is considerable relative movement of the pipe ends, particularly in rotation of one of the pipe ends relative to the other about the axis of the pipes, damage to the gasket can be minimized by forming a recess in the gasket which faces the middle of the clamp, and by providing a grease fitting in the clamp to permit the injection of grease. Pressure pulses applied to the pipe line during the pumping of concrete, tends to pump out small amounts of the grease to coat the gasket, so as to minimize friction between the gasket and a rotating pipe flange.

The novel features of the invention are set forth with particularity in the appended claims. The invention will be best understood from the following description when read in conjunction with the accompanying drawings.

The embodiments of the invention in which an exclusive property or privilege is claimed are defined as follows:

1. A pipe coupling for connecting two pipes, comprising:
   a clamp which includes a pair of body members pivotally joined at one side, which can be closed together over the ends of the pipes with the other ends of the body members locked together; and a ring-shaped gasket having a substantially uniform cross-section, said cross-section having a main body portion and a pair of axially-spaced ridges extending radially outwardly from the periphery of said main body portion;

said ridges having substantially flat radially outer surfaces and extending along a minority of the axial length of the gasket; said clamp includes a grease fitting communicating with the space between said axially-spaced ridges, and said gasket includes a pair of inner gasket flanges lying radially inside said ridges.

2. A pipe coupling for connecting the ends of a pair of pipes, comprising:

a ring-shaped gasket for mounting on said pipe ends to bridge the space between them; and a clamp having a body mountable around said gasket;

said gasket having a gasket body and a pair of axially-spaced gasket portions on its radially outer surface for sealing against said clamp while leaving a grease reservoir between said axially-spaced portions and between the clamp and gasket body;

said clamp having a grease fitting communicating with the grease reservoir, said fitting including a filler end on the outside of said clamp; and said gasket including a radially inner side and a radially outer side, and also including a pair of thick axially spaced gasket flanges on one side and a pair of thinner axially spaced gasket flanges on the other side, one of said pair of flanges forming said axially-spaced gasket portions, whereby to enable installation of said gasket either with said thick flanges on the outer side to provide a large volume grease reservoir, or on the inner side to facilitate installation on pipe flanges.

3. A coupled concrete-carrying pipe assembly comprising:

a pair of abutting pipes having ends that lie adjacent to one another, said pipes having outwardly extending pipe flanges, said pipe flanges having peripheral surfaces;

a ring-shaped gasket fitting over said peripheral surface of said flanges; and a clamp locking around said gasket and said pipe flanges.

said gasket having a sleeve-like main body portion, a pair of radially inwardly extending gasket flanges bearing against the peripheral surfaces of said pipe flanges, and a pair of radially outwardly extending gasket flanges bearing against the inside of said clamp and lying directly radially inside said outer gasket flanges, so that the outer gasket flanges are firmly held against the clamp;

said clamp including a grease fitting with an inner end communicating with the space which lies between said sleeve-like main body portion and said clamp and between said outer gasket flanges; and said sleeve-like main body portion of said gasket having an axial length at least twice its radial thickness, whereby grease can be installed in said space and thereafter the pressure of concrete pumped through the pipes can readily deflect the sleeve-like portion to pump out small amounts of grease past the radially outwardly extending flanges.

* * * * *